US006994018B2

(12) United States Patent
Bushman et al.

(10) Patent No.: US 6,994,018 B2
(45) Date of Patent: Feb. 7, 2006

(54) ROLLER DRIVE SYSTEM FOR A FRUIT OIL EXTRACTOR

(75) Inventors: Ronald C. Bushman, Fullerton, CA (US); Scott R. Alexander, Pasadena, CA (US); David J. Hancock, Chino Hills, CA (US)

(73) Assignee: Brown International Corporation, Covina, CA (US)

( * ) Notice: Subject to any disclaimer, the term of this patent is extended or adjusted under 35 U.S.C. 154(b) by 120 days.

(21) Appl. No.: 10/193,630

(22) Filed: Jul. 10, 2002

(65) Prior Publication Data

US 2004/0007105 A1 Jan. 15, 2004

(51) Int. Cl.
*A23N 1/02* (2006.01)

(52) U.S. Cl. .......................... 99/501; 99/513; 241/279; 83/866

(58) Field of Classification Search ................ 83/867, 83/30, 332, 866; 99/501, 503, 510, 513, 495; 241/91, 92, 93, 165.5, 277, 279, 278.1; 198/788, 198/782; 426/489
See application file for complete search history.

(56) References Cited

U.S. PATENT DOCUMENTS

| | | | | |
|---|---|---|---|---|
| 2,159,046 A | * | 5/1939 | Paxton et al. ................ | 99/495 |
| 2,178,007 A | * | 10/1939 | Thompson .................... | 99/629 |
| 2,527,364 A | * | 10/1950 | Koffler ........................ | 99/495 |
| 2,529,286 A | * | 11/1950 | Fraser .......................... | 99/510 |
| 3,382,964 A | * | 5/1968 | Bonhoff et al. ............. | 198/415 |
| 3,707,176 A | * | 12/1972 | Bushman ..................... | 83/867 |
| 3,954,032 A | * | 5/1976 | Holbrook ..................... | 83/867 |
| 4,070,959 A | * | 1/1978 | Bushman et al. ............ | 99/510 |
| 4,242,142 A | * | 12/1980 | Gee et al. .................... | 83/867 |
| 4,257,320 A | * | 3/1981 | Holbrook et al. ............ | 83/867 |
| 4,470,344 A | | 9/1984 | Bushman | |
| 5,086,910 A | * | 2/1992 | Terpstra ...................... | 198/572 |
| 5,201,397 A | * | 4/1993 | Isaacs ......................... | 198/395 |
| 5,730,274 A | | 3/1998 | Loomer | |
| 6,253,905 B1 | | 7/2001 | Pelka | |
| 6,415,915 B1 | * | 7/2002 | Grossman ................... | 198/788 |
| 6,460,683 B1 | * | 10/2002 | Pfeiffer ..................... | 198/460.1 |

OTHER PUBLICATIONS

IPEA/US International Preliminary Examination Report Jan. 28, 2005 (PCT/US03/21047).

* cited by examiner

*Primary Examiner*—Charles Goodman
(74) *Attorney, Agent, or Firm*—Perkins Coie LLP (57) ABSTRACT

Apparatus for extracting oil from the peel of whole citrus fruit includes a frame and a plurality of parallel horizontal rolls including toothed projections for piercing the outer surface of the whole fruit. Each of the plurality of rolls is rotatably supported via a rotatable shaft that is mounted to the frame. A plurality of motors are secured to the frame, each of the plurality of motors are mechanically coupled to a corresponding shaft of the rolls, wherein each motor independently rotates the shaft and roll. The apparatus also includes a controller for individually controlling the rotational speed of each of the rolls.

15 Claims, 9 Drawing Sheets

ROLLER DRIVE SYSTEM FOR A FRUIT OIL EXTRACTOR

BACKGROUND OF THE INVENTION

The field of the invention relates to devices for the extraction of oil from fruit.

There is currently an increasing world-wide demand for oils derived from the peels of citrus fruits. This is particularly so for lemon oil. Generally, these oils have been obtained by one or more mechanical operations performed on the rind or peel of the particular fruit. One particular type of device used to extract oils from whole fruit is disclosed in U.S. Pat. No. 4,070,959, incorporated by reference. This patent discloses an apparatus that utilizes a large number of horizontal parallel rollers. The rollers include thin metal rings having sharp teeth. During operation, whole fruit travels over the rollers and moves into and out of adjacent troughs between the rollers.

The trough region between adjacent rollers within a group of rollers, is generally referred to as the working region, since this is the area where the teeth of the rollers puncture the exterior surface of each whole fruit in a substantially uniform manner. The oils present within the cells in the peel or rind are released when pierced and agitated by the rollers.

As described in U.S. Pat. No. 4,070,959, the rollers are driven by a series of drive chains and sprockets. The horizontal rollers are arranged into groups or series. FIG. 2 of U.S. Pat. No. 4,070,959 shows rollers driven in groups of four. Individual drive chains engage the four adjacent rollers. While each roller within a group is driven in the same direction, the next adjacent roller rotates at a progressively lower rate. This speed differential produces penetration of the teeth into the rind or peel.

There is a disadvantage, however, when using groups of rollers to pierce the exterior surface of whole fruits. The pocket or trough formed between the last roller of one group and the first roller of the next group is what is referred to as a non-working pocket. This non-working pocket between the adjacent group of rollers results from the higher speed roller trying to pull the fruit out of the pocket faster than the slower roller is trying to pull it in. In a standard machine having forty rollers, when groups of four rolls are employed, there are 9 non-working pockets.

Attempts have been made to increase the efficiency of these types of machines by using groups of 8 rollers instead of four rollers. A standard 40 roller machine using groups of 8 rollers has only 4 non-working pockets.

Machines employing large numbers of rollers within a group, however, are undesirable in certain aspects. For example, it is often desirable to change the speed differential between adjacent rollers within a group as the condition of the fruit changes (i.e., ripe fruit vs. non-ripe fruit). This has been accomplished by mechanically adjusting the drive chains on alternate sprockets on the machine. While this operation can be performed relatively quickly in machines using groups of 4 rollers, the procedure and devices necessary for groups of 8 rollers are much more complex. It could take a mechanic several hours to make the needed changes in a machine having groups of 8 rollers. This creates costly downtime that reduces the overall throughput of the machine.

Thus, there is a need for an machine that increases the efficiency of oil extraction. In addition, there is a need for a machine that requires little or no downtime when adjustments are made to the rotational speeds of adjacent rollers. It is also desirable to have a machine that can form various groupings of rollers depending on the job requirement.

SUMMARY OF THE INVENTION

In one aspect of the invention, an apparatus for extracting fruit oil includes a frame and a plurality of horizontal rollers including toothed projections for piercing the outer surface of the fruit. Each of the rollers is rotatably supported via a shaft mounted to the frame. Individual motors are each mechanically coupled to a shaft of a roller. Each motor independently rotates the shaft and roller attached to that motor. The apparatus also preferably includes a controller for controlling the rotation of the rollers.

In a second, separate aspect of the invention, an apparatus includes a frame and plurality of horizontal rollers including toothed projections for piercing the outer surface of fruit. Each roller is supported on a rotatable shaft mounted to the frame. Each shaft further includes at least one sprocket mounted to one end thereof. A plurality of motors are secured to the frame. Each motor includes a drive shaft having a sprocket mounted thereon. A drive chain mechanically couples the sprocket on each of the motors to the corresponding sprocket on one of the rotatable shafts mounted to the frame. Each roller is thus independently driven by a separate motor. The apparatus also includes a controller for controlling the rotational speed of the motor, and in turn, the rotational speed of each roller.

In yet another aspect of the invention, in a method of extracting fruit oil, the whole fruit is loaded onto a plurality of rotatable horizontal rollers. Each of the rollers is rotated to puncture the fruit peel to release the fruit oil. The rotational speed of each of the rollers is preferably controlled according to a pre-programmed set of instructions.

Accordingly, it is an object of the invention to provide an improved machine for extracting oil from fruit. Other objects and advantages will appear below.

DETAILED DESCRIPTION OF THE PREFERRED EMBODIMENTS

Figure 1:
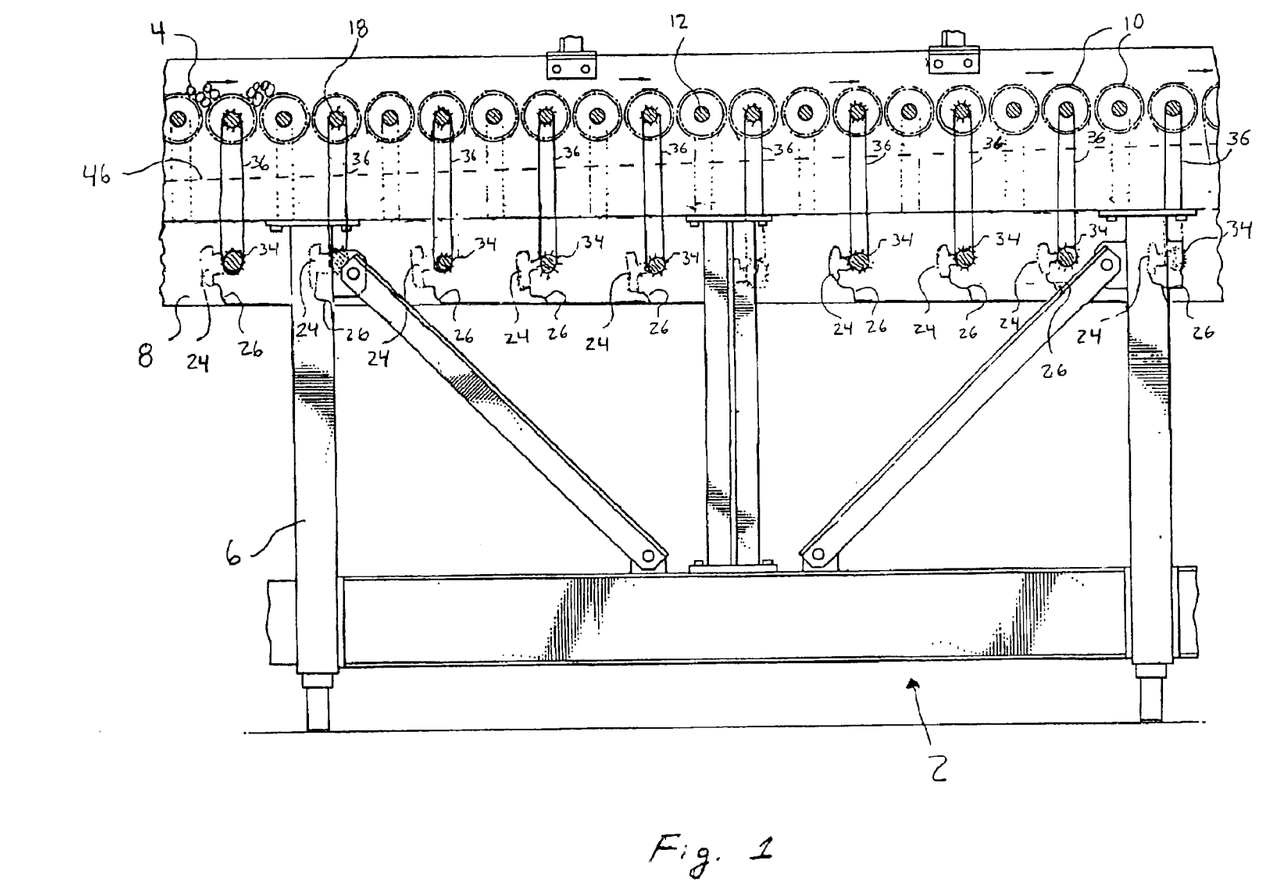
FIG. 1 is a left side view of the present apparatus for extracting oil from the peel of citrus fruit.

Turning now to the drawings, FIG. 1 illustrates a side view of the apparatus 2 for extracting oil from the peel of fruit 4. The apparatus 2 includes a frame supporting structure 6. The frame 6 includes two side walls 8 that support a plurality of parallel horizontal rollers 10. The rollers 10 are mounted on a rotatable shaft 12 that traverses the two side walls 8 of the frame 6. The shaft 12 is rotatable via two bearings 14 mounted within the two side walls 8.

Figure 2:
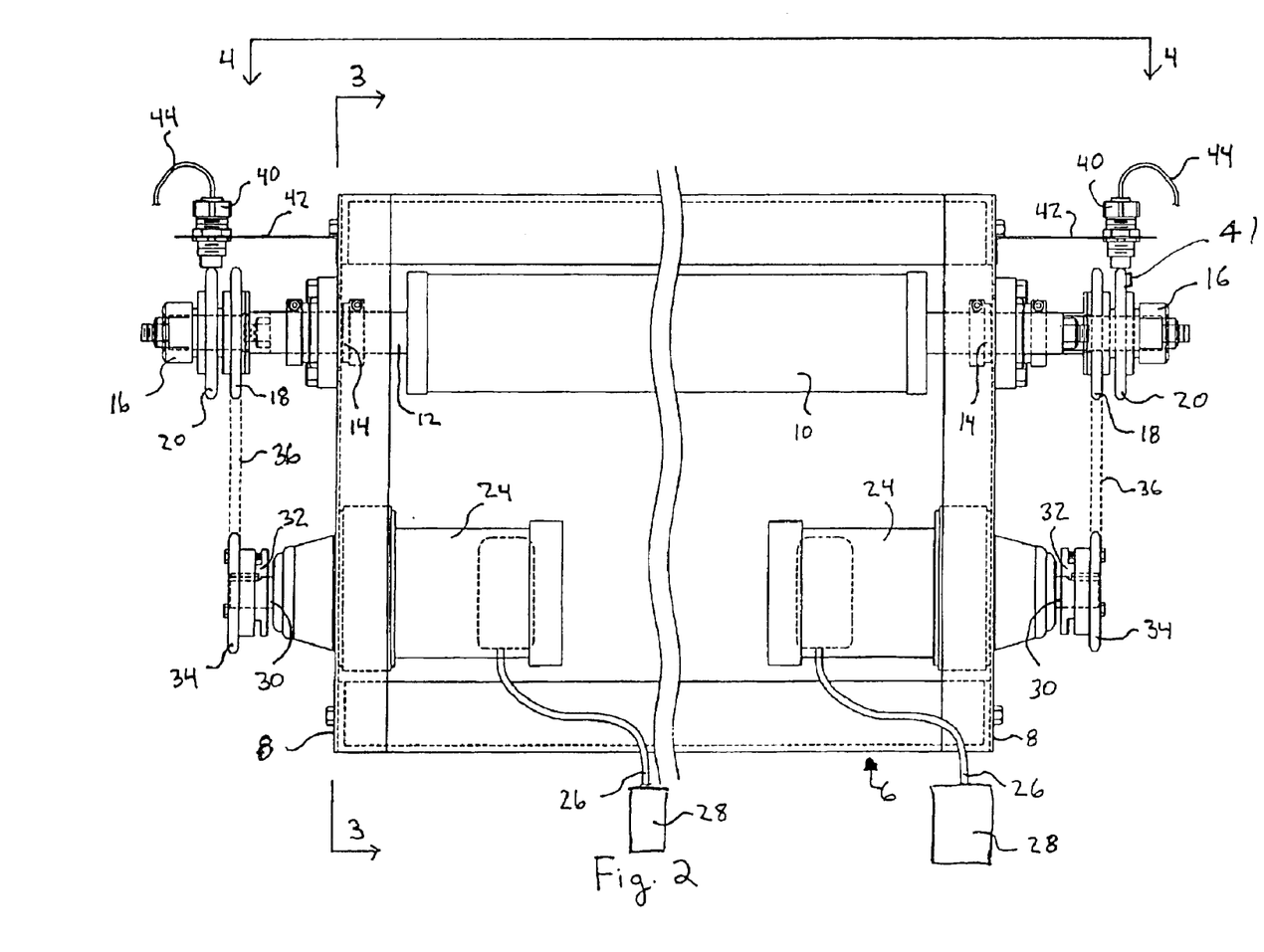
FIG. 2 is a front view of the apparatus shown in FIG. 1, illustrating the arrangement of the motors and rollers.
Figure 3:
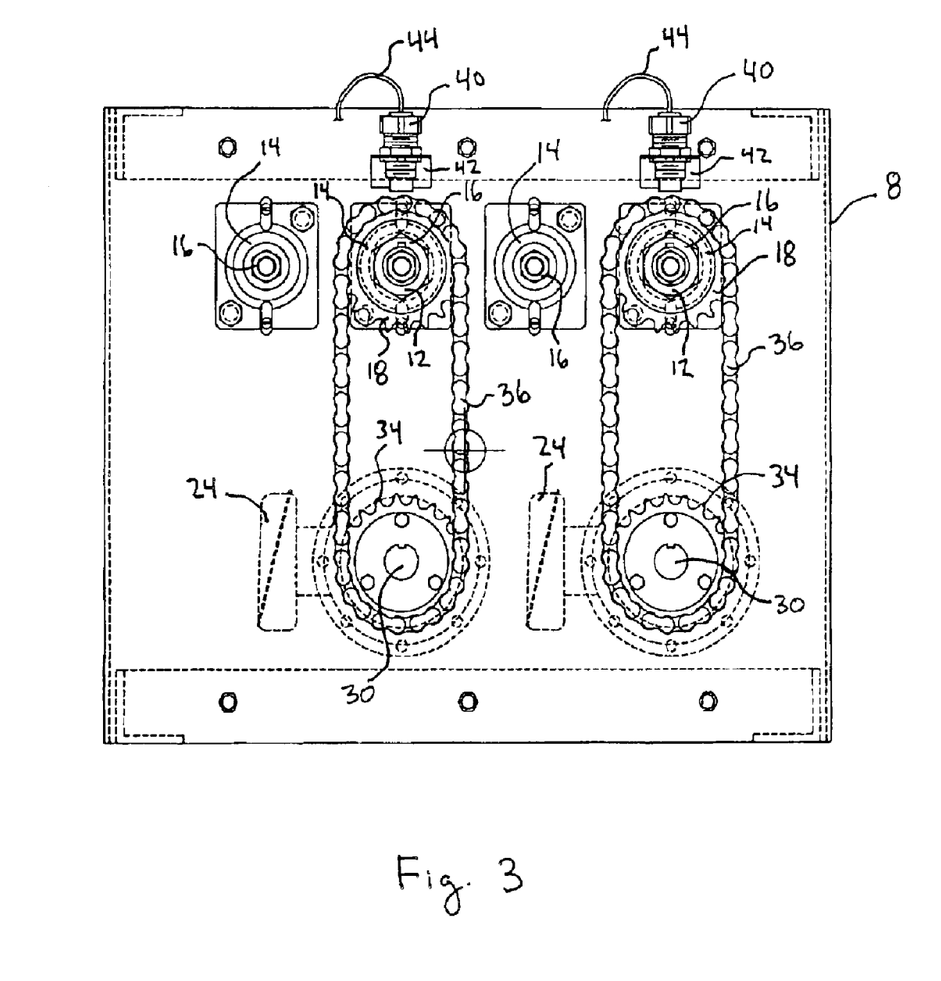
FIG. 3 is a side view of the apparatus taken along the line 3—3 of FIG. 2.
Figure 4:
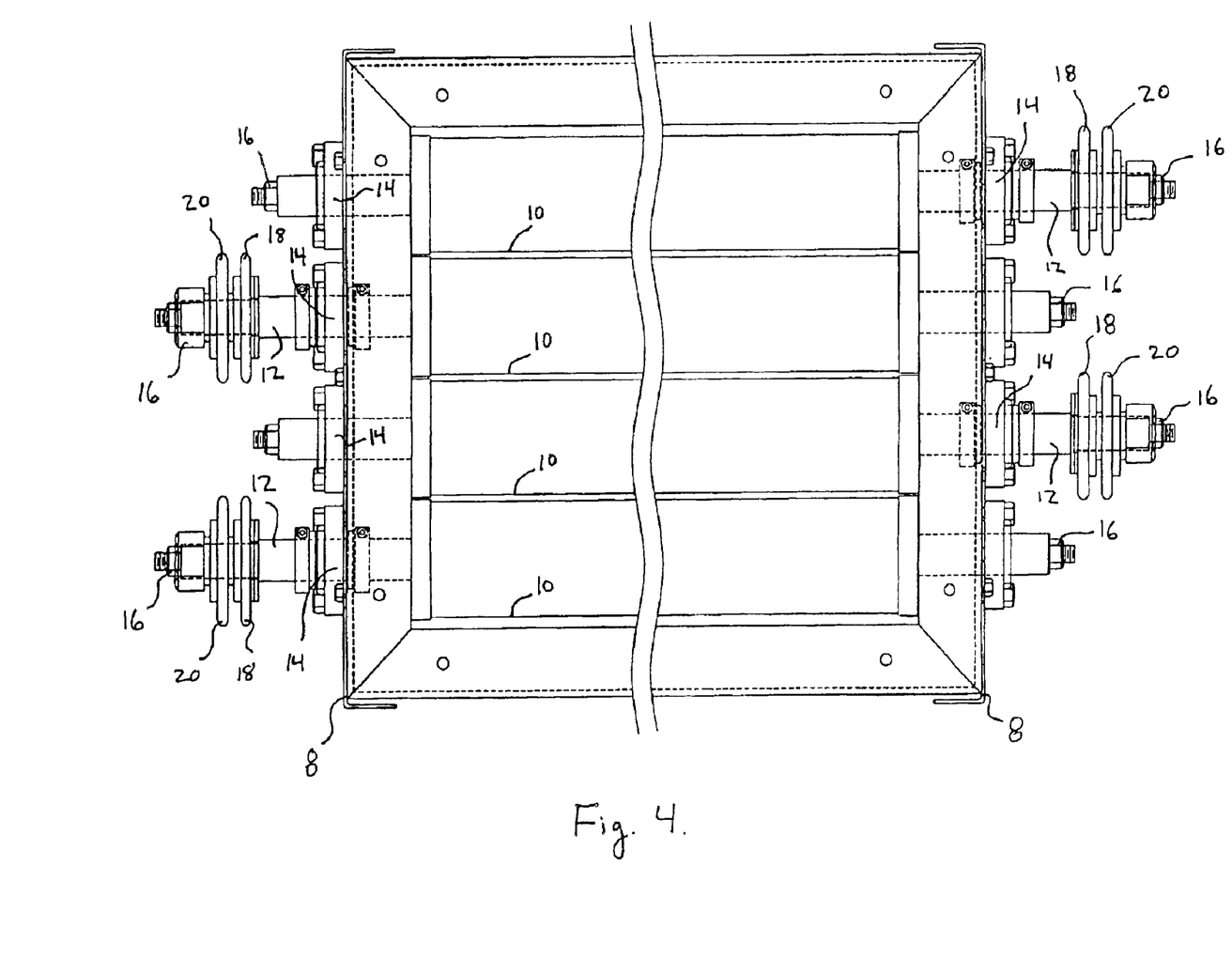
FIG. 4 is a top view of the apparatus taken along the line 4—4 of FIG. 2.
Figure 5:
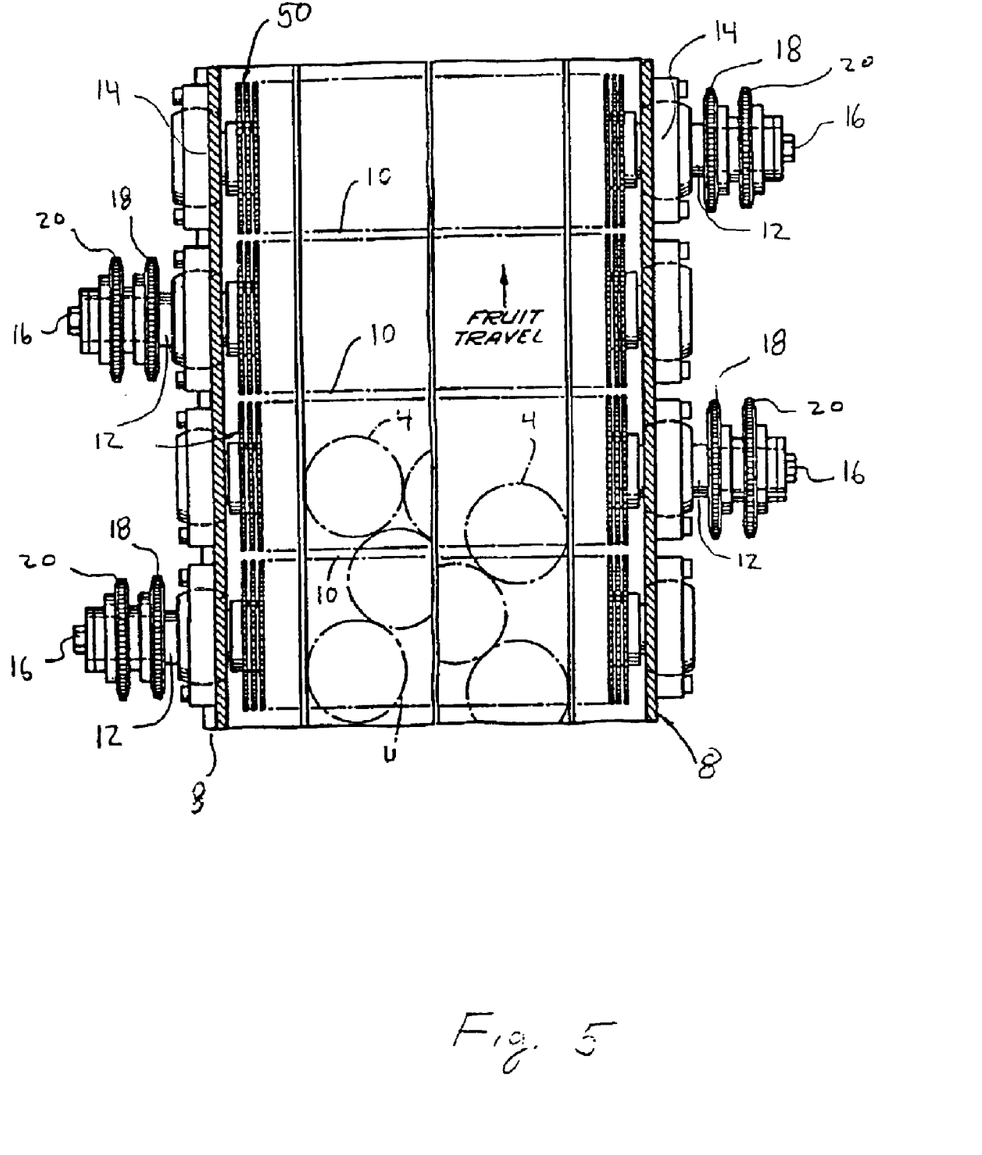
FIG. 5 is a partial plan view, in part section, illustrating the plurality of horizontal rollers.

As can be seen in more detail in FIGS. 2 and 4, the shaft 12 extends through the side walls 8 and is held in place by end nuts 16. On one of the side walls 8, the shaft 12 projects enough to hold at least one sprocket 18. This sprocket 18 is referred to as the roller sprocket 18 since it drives the rotation of its corresponding roller 10. While only one sprocket 18 is necessary, additional sprockets 20 can also be located on the shaft 12. For example, FIGS. 2, 4, and 5 show two sprockets 18, 20 on the shaft 12. One sprocket 18 is used for driving the roller 10, while the other sprocket 20 is used to monitor the rotational speed of the roller 10.

Referring now to FIGS. 1 through 4, a motor 24 is located beneath the sprocket 18. Preferably, there are a plurality of motors 24. The motors 24 are each preferably mounted to the frame 6, and more preferably, to one of the side walls 8. The motors 24 are connected via a power cord 26 to a power source 28. Each motor 24 includes a drive shaft 30 that projects outwardly from one of the side walls 8. A motor sprocket 34 is attached to a coupling 32 on the drive shaft 30. The motor sprocket 34 thus rotates with the drive shaft 30 of the motor 24.

Any number of motors and corresponding rollers 10 may be used. Preferably, the motor 24 is a servomotor although other types of motors may be used as well. If a servomotor is used, it can be either AC or DC powered. Although even a single motor linked to the rollers (through a transmission capable of varying individual roller speed) may be used, in the preferred design, multiple motors are used, with each motor separately driving a roller.

A drive chain 36 mechanically connects the motor sprocket 34 to the roller sprocket 18. The drive chain 36 is preferably a chain comprising individual links. Most preferably, the drive chain 36 connects vertically adjacent rolls 10 and motors 24. In this regard, each roller 10 is mechanically connected to a motor 24 that is located directly below the roller 10. As an alternative to the drive chain 36 drive system, the motors 24 can be linked to drive the rollers directly, via, e.g., a shaft coupling, or via gears or other equivalents. In this regard, the motors 24 can be mounted on the same axis as the rollers 10. Another alternative drive system may employ hydraulic motors to drive the rollers 10.

As best shown in FIGS. 1 through 5, the motors 24 and the rollers 10 are preferably staggered within the frame 6. Accordingly, the drive mechanism (which includes the motor 24, drive shaft 30, motor sprocket 34, roller sprocket 18, and shaft 12) alternates on either side wall 8 for each adjacent roller 10. This staggered configuration is used because the individual motors 24 are larger than the diameter of each roller 10. Of course, if smaller motors 24 are employed, the staggered distribution is not necessary.

Figure 12:
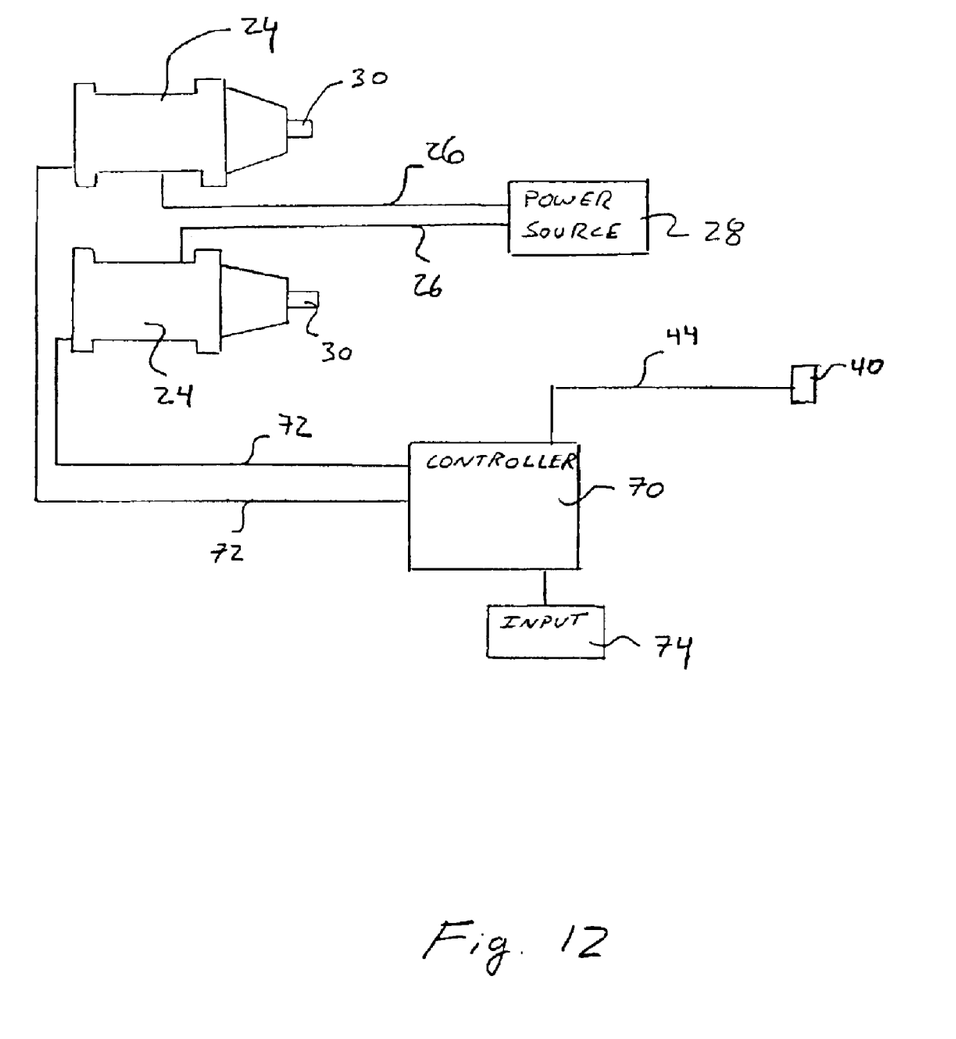
FIG. 12 schematically shows two motors connected to a controller.

In one aspect of the invention, a tachometer sensor 40 may be used to monitor the rotational speed of the rollers 10. The tachometer sensor 40 is a tachometer pick-up that is fixed via a bracket 42 to the side wall 8 of the frame 6. The bracket 42 is preferably mounted directly above the sprocket 18. A plurality of tachometer sensors 40 can be mounted to the side walls 8, with each tachometer sensor 40 mounted adjacent to a corresponding roller 10. A tachometer target 41 is preferably attached to a second sprocket 20 on the shaft 12. The sensor 40 senses the target 41 every time it passes by. The tachometer sensor 40 includes a communication line 44 which then reports the rotational speed data to a monitor, display, or controller 70, as shown in FIG. 12. Alternatively, the tachometer pick-up 40 may be placed on or within the motor 24. In this design, there is no need for second sprocket 20.

Referring to FIG. 1, the apparatus 2 includes an inclined pan 46. The inclined pan 46 is located beneath the rollers 10. The inclined pan 46 collects the oil extracted from the fruit and a discharge port, where the oil is collected. One or more spray heads may be used to aid in the extraction of citrus oil from the fruit 4 as shown in U.S. Pat. No. 4,470,344, incorporated herein by reference.

Figure 6:
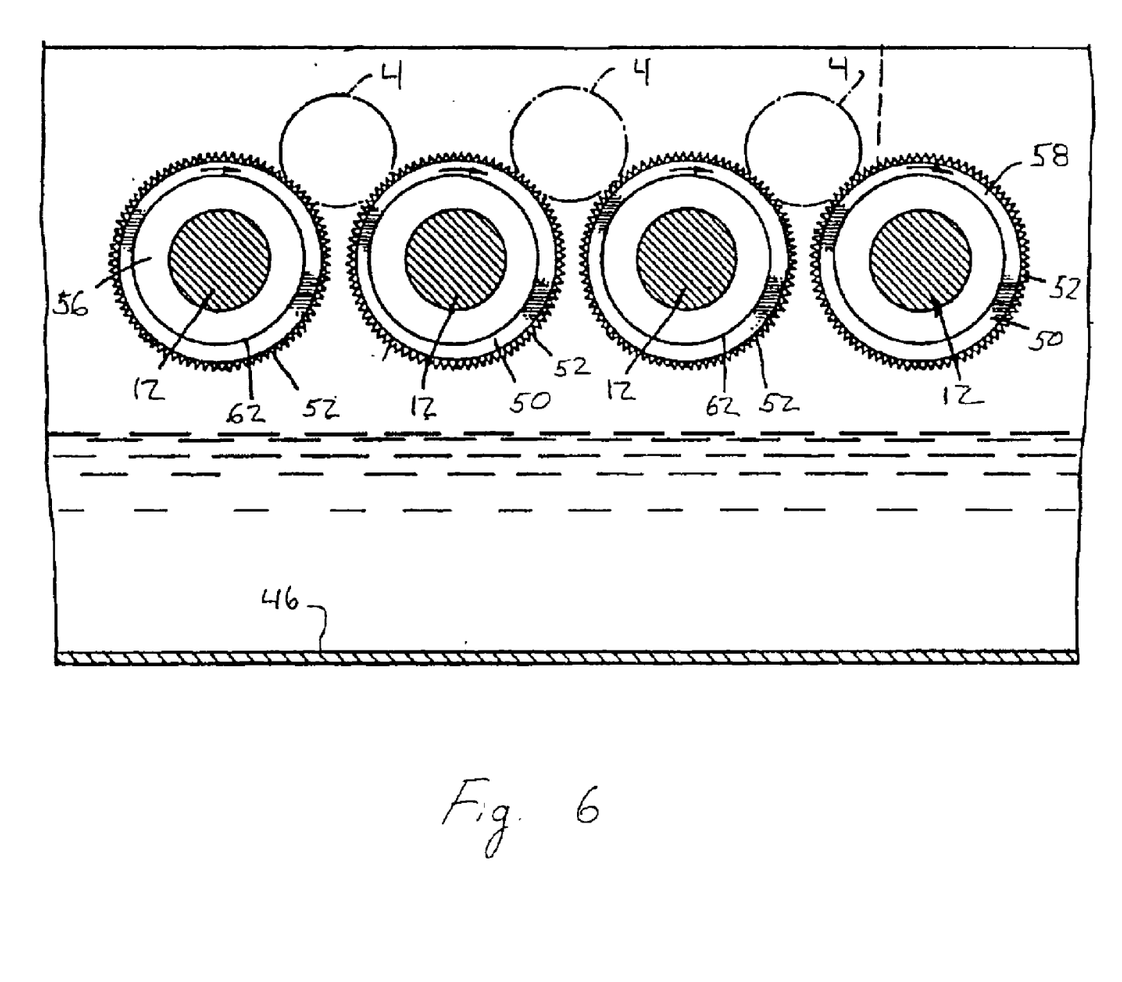
FIG. 6 is a sectional side elevation of the apparatus shown in FIGS. 1–5.
Figures 7, 8, 9, 10, 11:
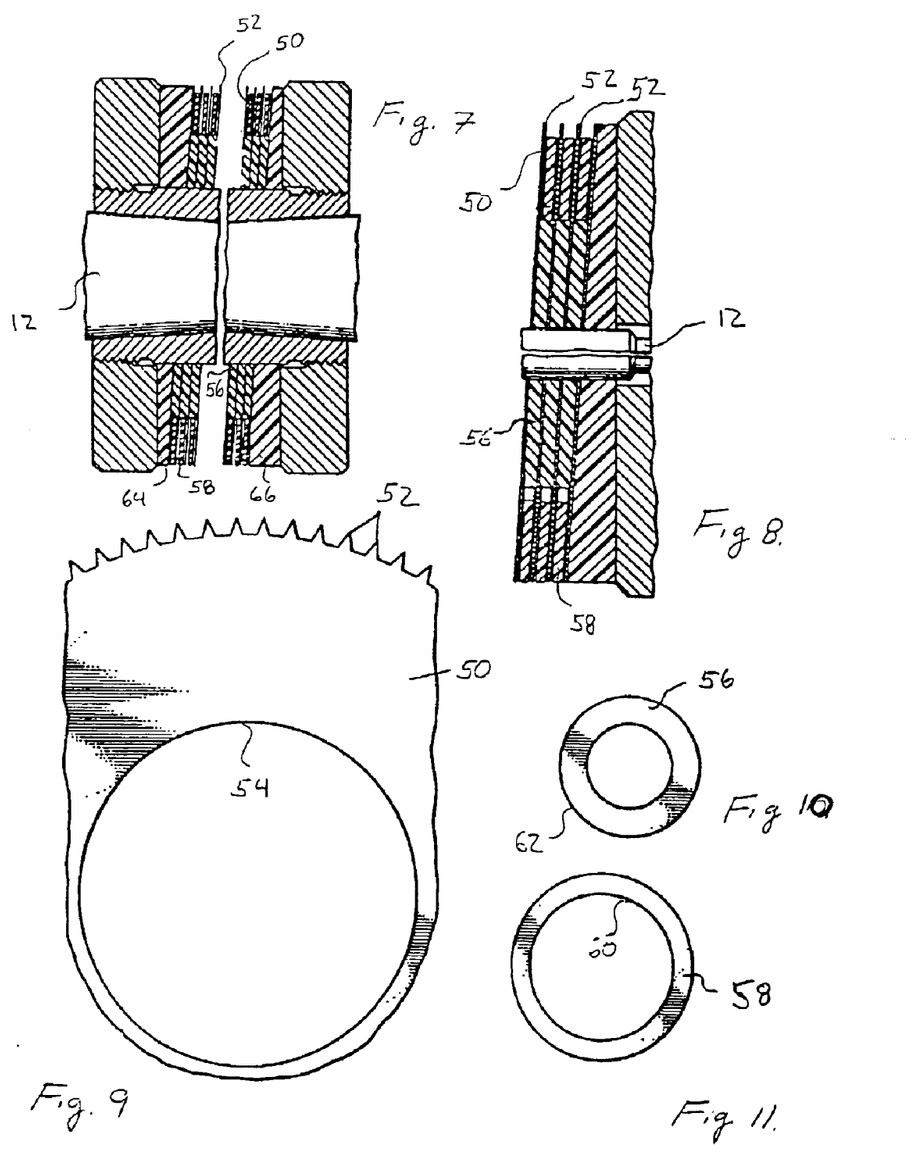
FIG. 7 is a sectional elevation showing details of the mounting of the toothed rings on the shaft.
FIG. 8 is similar to FIG. 7, showing details of the parts on an enlarged scale.
FIG. 9 shows a portion of one of the toothed rings on a still larger scale.
FIG. 10 shows one of the washer spacer disks employed between each pair of toothed rings.
FIG. 11 shows one of the washers which encircles its corresponding disk.

As shown in FIGS. 5 through 8, each toothed roller assembly includes a shaft 12 encircled by a large number of very thin rings 50. The rings 50 have sharp pointed teeth 52 around the circumference. The inner concentric circular opening 54 in each toothed ring 50 is large enough to receive the cylindrical portion of the shaft 12. As best shown in FIG. 8, spacer disks 56 are positioned between toothed rings 50. A washer 58 encircles each of the spacer disks 56. The thickness of the washers 58 are preferably slightly less than the thickness of the spacer disks 56, and the inside diameter 60 of the washers 58 is greater than the outside diameter 62 of the spacer disks 56. Accordingly, the washers 58 are free to move radially to a limited extent to prevent accumulation of unwanted materials between toothed rings 50. The toothed rings 50 and washers 58 are clamped between tapered blocks 64, 66 and turn with the shaft 12.

As shown in FIGS. 1 and 6, during operation of the apparatus 2, adjacent toothed rings 50 form gaps or bights between them for reception of whole fruit 4. The sharp teeth 52 of the rings 50 puncture the outer surface of each fruit 4, releasing the oil contained within the peel.

With reference now to FIG. 12, a controller 70 is in communication with each of the plurality of motors 24 via communication lines 72. The controller 70 sends control signals to each of the motors 24. The control signals modulate such aspects as rotational speed, rotational direction, and rotational profile of each roller 10. The rotational profile can include motion such as indexing, acceleration, deceleration, and the like. While FIG. 12 only shows two motors 24, the controller 70 can be used to control any number of motors 24, and hence, any number of rollers 10. It is preferable that the controller 70 be able to independently control each of the motors 24. Thus, each individual roller 10 can have a different rotational speed, depending on the signal delivered to each motor 24. In this manner, the speed differential for each adjacent roller 10 can be precisely controlled.

The precise control of the rollers 10 can reduce, the non-working pockets that were present in prior machines that use a pulley-type arrangement. The present machine 2 thus increases the overall number of working pockets for given number of rollers 10. In addition, there is no down time necessary to make adjustments to the rotational speeds of adjacent rollers 10 within a group since these changes can be made on-the-fly electronically via the controller 70. In addition, a virtually unlimited number of variations can be set up with relative ease. For example, the apparatus 2 can be set with three groups of seven rollers 10, two groups of six rollers 10, and one group of seven rollers 10, all with varying speed differentials and group speeds.

Preferably, the controller 70 can be pre-programmed with a variety of configurations including a number of variables. The variables can include: the number of rollers 10 in a group, the roller speed (rpm) of each roller 10 within a group, and the speed differentials between different groups of rollers 10, and the speed differential between adjacent rollers 10 within a group. The controller 70 can also advantageously switch between different pre-programmed sets of instructions based on one or more parameters. The parameters can include, for example, fruit variety, fruit condition, fruit throughput, and fruit oil extraction yield. In this regard, the machine 2 can quickly change to optimize any given parameter based on process conditions. The machine 2 is well suited for extracting oil from the peel of whole citrus fruit, especially of lemons and similar fruit. However, it may also find uses in other applications.

The controller 70 can be any number of devices capable of sending individual control signals to the plurality of motors 24. Preferably, the controller 70 is a computer or CPU. The pre-programmed set of instructions can be stored in the computer or CPU in ROM or RAM. Even more preferably, software is employed that contains the pre-programmed set of instructions, or is capable of creating, modifying, storing, or downloading the pre-programmed set of instructions. It is also preferable that the controller 70 include an input device 74 used to input different pre-programmed sets of instructions. Such input device 74 can include a keyboard, a disk drive, CD-ROM, DVD drive, tape drive, or the like.

In one application of the apparatus 2, the rollers 10 can be controlled to significantly increase the throughput of the apparatus 2. As has been described herein, work is done on the fruit 4 while the fruit 4 is in the trough between adjacent rollers 10. While fruit 4 is transferring from one position on the bed of rollers 10 to another position, no real work is being done. In this application of the apparatus 2, the entire apparatus 2 is loaded with fruit 4. The controller 70 is pre-programmed with instructions to provide a rolling "differential" under the fruit 4. "Differential" refers to the different rotational speeds between adjacent working rollers 10. In this method of operation, the differential across the entire apparatus 2 would start low and increase over time. The rollers 10 are driven in groups to limit maximum and minimum roller speeds. Preferably, the location of the non-working pockets (i.e., the space between adjacent groups of rollers 10) can be controlled to progress beneath the bed of fruit 4 so that all fruit 4 is worked evenly.

Figure 13:
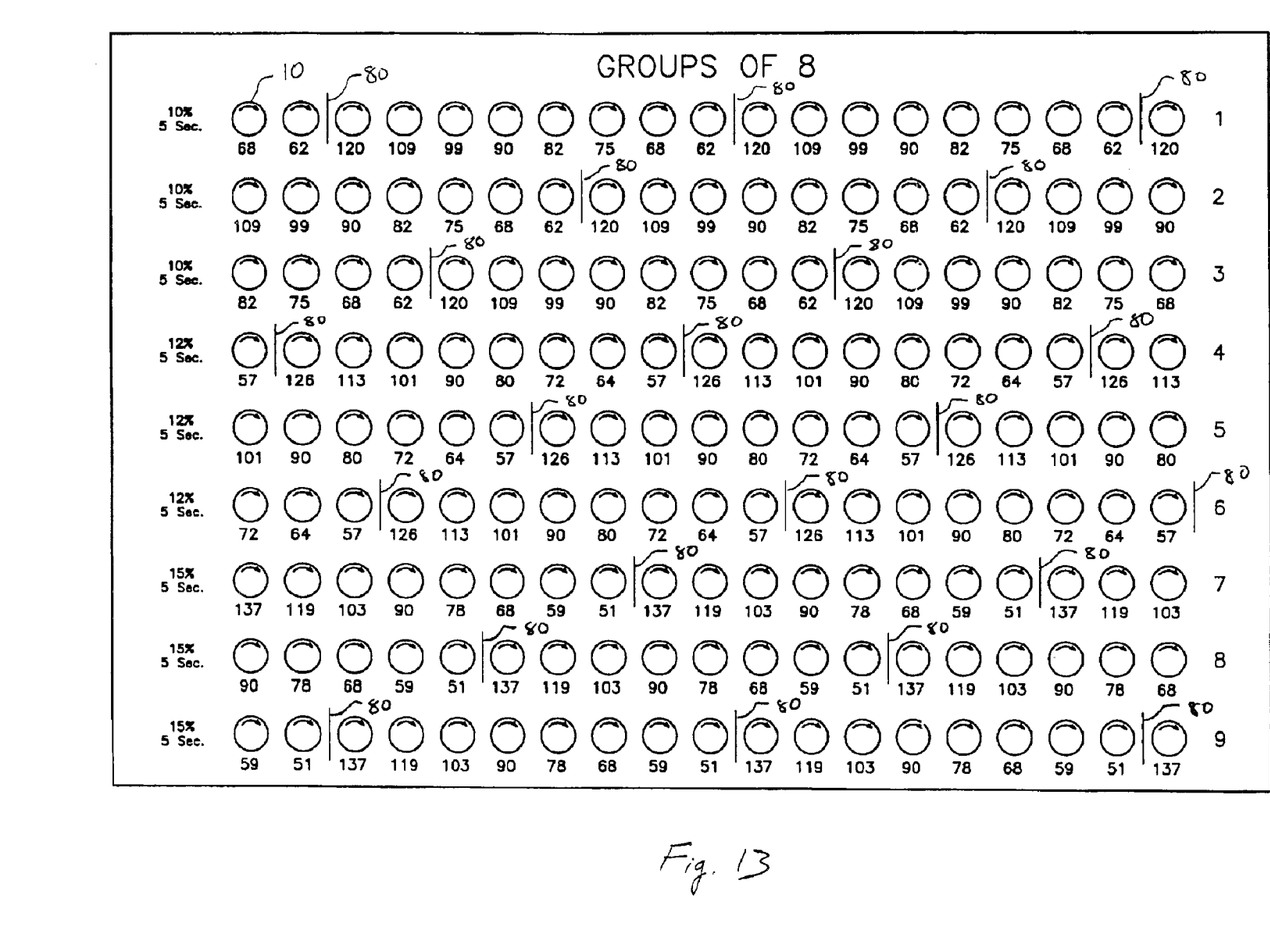
FIG. 13 shows one preferred sequence of driving the rollers of the apparatus.

FIG. 13 shows one example using the rolling differential sequence described above. A series of nineteen rollers 10 are shown that rotate in the direction of the arrows on each roller 10. The nineteen rollers 10 are divided into groups of eight. It should be understood that there are a virtually infinite number of differential sequence combinations that can be employed and that the one described herein is merely one example. The rotational speed of each roller 10 is shown below each roller 10 (in revolutions per minute). In this sequence, about 45 seconds are required to remove a high percentage of oil from the fruit 4. This compares with the roughly 75–90 seconds it takes in conventional sequences wherein the fruit 4 starts at one end of the apparatus 2 and travels the length of the apparatus 2 to the other end. The non-working pockets 80 are shown between adjacent groups of rollers 10. In this example, nine settings of five seconds each are used to work the fruit 4. In the first three settings, the differential remains relatively low within the groups of rollers 10, at about 10%. The next three settings have a higher differential of about 12%. Finally, the last three settings have a differential of about 15%.

In this method of fruit oil extraction, the fruit 4 remains stationary in between the rollers 10 while the fruit 4 is being worked on. The fruit 4 moves across the rollers 10 only when the fruit 4 is unloaded from the apparatus 2. This differential sequence is particularly useful in the extraction of fruit oil from crisp fresh fruit 4. It is known, for example, that crisp fresh fruit 4 requires a lower roller 10 speed differential to avoid damaging the fruit 4. As the fruit 4 is worked, however, the differential can be increased without damaging the fruit 4.

While embodiments of the present invention have been shown and described, various modifications may be made without departing from the scope of the present invention. The invention, therefore, should not be limited, except to the following claims and their equivalents.

What is claimed is:

1. An apparatus for extracting oil from the peel of whole citrus fruit comprising:
    a frame;
    a plurality of rollers rotatably mounted on the frame, and including toothed projections for piercing the outer surface of the whole fruit, with the rollers spaced apart from each other to form troughs between them adapted for receiving the whole fruit, so that when the fruit is in the apparatus, it is supported on no more than two rollers;
    a plurality of motors, with substantially each motor of the plurality of motors driving a roller; and
    a controller for separately controlling the rotational speed of each of said rollers by controlling the rotational speed of substantially each motor, such that a speed differential is created between substantially each successive roller.

2. An apparatus according to claim 1 further comprising a plurality of roller shafts, with each roller supported on a roller shaft, and wherein each of said shafts includes a shaft sprocket at one end thereof.

3. An apparatus according to claim 2, wherein each of said motors includes a motor sprocket mounted on a drive shaft of the motor.

4. An apparatus according to claim 3, further comprising a drive chain mechanically connecting the shaft sprocket and the motor sprocket for each of said mechanically coupled motors and shafts.

5. An apparatus according to claim 1, further including a sensor for measuring the rotational speed of each of said plurality of rollers.

6. An apparatus according to claim 1, wherein each adjacent roller is mechanically coupled to a motor on an opposing side of the frame.

7. An apparatus according to claim 1, further including a sensor for measuring the rotational speed of each of said plurality of rollers.

8. An apparatus according to claim 1, wherein each adjacent roller is mechanically coupled to a motor on an opposing side of the frame.

9. A fruit processing machine comprising:
    a plurality of drive motors;
    a plurality of rollers, with each roller linked to a corresponding one of the drive motors; and
    control means for individually and separately controlling rotational speed of each of the motors, to create a rolling speed differential between substantially each adjacent roller.

10. A machine for extracting fruit oil from whole fruit, comprising:

a frame;

a plurality of rollers on the frame, with the rollers spaced apart from each other to form troughs between them adapted for receiving whole fruit;

toothed projections on substantially each of the rollers for piercing the outer surface of the whole fruit;

a motor associated with substantially each of one of the rollers; and a controller linked to substantially each of the motors, for individually controlling the speed of each motor to create a rolling speed differential between substantially each one of the rollers.

11. The machine of claim 10 with the controller controlling the speed of each motor based, at least in part, on one or more of fruit variety, fruit condition, throughput, or oil extraction yield.

12. The machine of claim 10 further including an input end and an output end, and with roller rotation speed progressively increasing from the input end towards the output end.

13. The machine of claim 10 wherein substantially each motor is connected to a roller via a chain, gears, a shaft coupling, or a direct connection.

14. The machine of claim 10 wherein the controller is programmed to control the motors based on parameters including the type of fruit to be processed.

15. A fruit processing machine comprising:

a plurality of drive means;

a plurality of rollers, with each roller linked to a corresponding one of the drive means; and control means for separately controlling a rotational speed of each of the drive means, and for creating a rolling speed differential between substantially each one of the rollers.

* * * * *